United States Patent [19]

Epple et al.

[11] 4,119,644
[45] Oct. 10, 1978

[54] ANTHRAQUINONOID DISPERSE DYES

[75] Inventors: Gerhard Epple, Weisenheim; Walter Himmele, Walldorf; Werner Fliege, Otterstadt, all of Fed. Rep. of Germany

[73] Assignee: BASF Aktiengesellschaft, Ludwigshafen am Rhein, Fed. Rep. of Germany

[21] Appl. No.: 792,728

[22] Filed: May 2, 1977

[30] Foreign Application Priority Data

May 22, 1976 [DE] Fed. Rep. of Germany ....... 2623172

[51] Int. Cl.$^2$ .......................................... C07D 309/06
[52] U.S. Cl. .................... 260/345.9 R; 8/88
[58] Field of Search ................... 260/345.9 R

[56] References Cited
FOREIGN PATENT DOCUMENTS
1,284,932 8/1972 United Kingdom ..................... 260/571

Primary Examiner—Nicky Chan
Attorney, Agent, or Firm—Keil, Thompson & Shurtleff

[57] ABSTRACT

Dyes of the formula

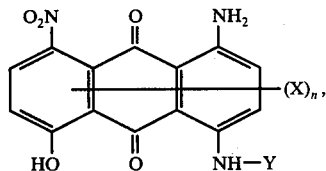

where X is chlorine or bromine, Y is

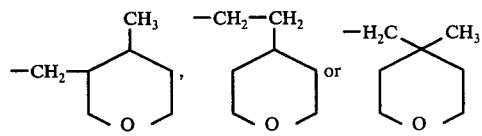

and $n$ is 0, 1 or 2. On synthetic fiber materials, the dyes give clear blue colorations which are very fast to thermofixing and fast to light.

8 Claims, No Drawings

ANTHRAQUINONOID DISPERSE DYES

The present invention relates to new anthraquinonoid disperse dyes based on 1,4-diamino-nitro-hydroxyanthraquinone.

The new dyes have the formula

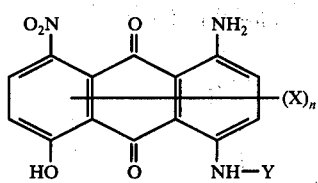

where X is chlorine or bromine and Y is

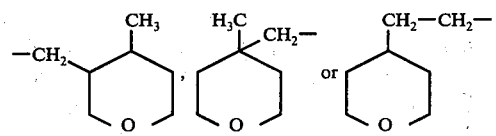

and $n$ is 0, 1, or 2.

The dyes color synthetic textile materials, especially consisting of polyester, nylon and cellulose acetate fibers, in clear blue hues. The dyes are very fast to thermofixing, washing and light.

The dyes (I), in the pure form or, preferably in the form of mixtures containing the various dyes of the formula (I), may be used for dyeing synthetic fibrous materials. Mixtures of compounds (I) in which $n$ is 0 and 1 and X is bromine are particularly preferred. Of these mixtures, those containing from 5 to 12% by weight of bromine are, in turn, preferred.

Dye mixtures of compounds (I), where Y is

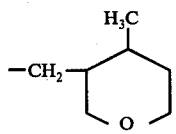

X is Br and $n$ is 0 and 1, which contain from 5 to 12% by weight of bromine, are very particularly preferred.

The dyes of the formula I with $n = 0$ can be manufactured by condensing 1-amino-8-nitro-4,5-dihydroxyanthraquinone with amines Y-NH$_2$ in the presence of boric acid in accordance with the process described in British Pat. No. 1,284,932.

The condensation is advantageously carried out by introducing the boric acid into phenol, distilling off the water, then adding the amino-nitro-dihydroxyanthraquinone and the amine Y-NH$_2$ and thereafter heating the reaction mixture, advantageously at from 60° to 110° C., until the reaction has ended. The reaction product is precipitated by adding a diluent, eg. methanol, ethanol, isopropanol, isobutanol or mixtures of methanol, isopropanol or ethanol with water, and is isolated by conventional methods.

The dyes of the formula I, where X is chlorine or bromine and $n$ is 1 or 2 are obtained by halogenating the corresponding compounds of the formula I, where $n$ is 0, in solvents which are inert under the reaction conditions, in the presence or absence of halogenation catalysts, by conventional methods.

Examples of suitable inert solvents are sulfuric acid, glacial acetic acid and, preferably, monohydrate (i.e., H$_2$SO$_4$.H$_2$O). In addition, oleum containing up to 24% by weight of free sulfur trioxide, in the presence of boric acid, is a suitable inert reaction medium.

Bromine or chlorine are used as halogenating agents. The halogenation is advantageously carried out by dissolving or suspending the starting compound in the solvent and then adding the halogenating agent, eg. by passing it into the mixture, or adding it dropwise. The halogenation takes place at between 0° and 60° C., preferably at between 20° and 40° C. As a rule, the reaction has ended after from 2 to 15 hours. The dye is precipitated by pouring the reaction mixture on to ice or into an ice/water mixture and is isolated by conventional methods.

The amines Y-NH$_2$ required for the manufacture of the compounds of the formula (I) are obtained by reductive amination of 4-methyltetrahydropyranyl-3-aldehyde.

The new dyes are superior to the dyes described in British Pat. No. 1,284,932 in respect of their tinctorial and technological properties, eg. build-up capacity and stability to contact heat.

The dye obtainable as described in Example 2 is significantly superior to the dye disclosed in Example 38 of the above British patent, i.e.

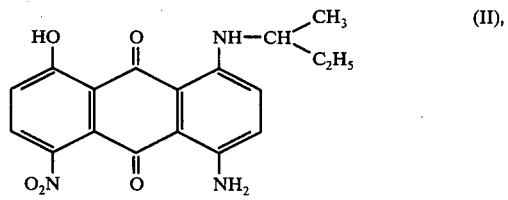

in its build-up capacity when dyeing polyester fibers, and in its heat stability (fastness to thermofixing), eg. when exposed to contact heat. If the fastness to thermofixing of dyeings of equal depth is tested at 210° C. (duration of 30 seconds), the dyeing produced using the dye of the invention (Example 2) bleeds only slightly on to the accompanying white polyester fabric. In contrast, the dyeing obtained with the dye (II) bleeds significantly into the accompanying white polyester material.

The Examples which follow illustrate the invention; parts and percentages are by weight.

EXAMPLE 1

200 parts of phenol, 8.8 parts of boric acid and 130 parts of toluene are heated for 3 hours at 130° C., and at the same time a toluene-water mixture is distilled off. The batch is then cooled to 80° C., 25.4 parts of 3-aminomethyl-4-methyl-tetrahydropyran and 30 parts of 1-amino-8-nitro-4,5-dihydroxyanthraquinone are added and the reaction mixture is stirred for 1 hour at 100° C. When it has cooled, the dye is precipitated by adding 300 parts of methanol, and is filtered off, washed with methanol and water and dried. Yield: 23.6 parts of dye (formula I, where $n$ is 0 and Y is

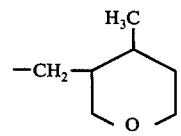

in the form of a dark powder, of melting point 221° C.

| Analysis: $C_{21}H_{21}N_3O_6$ | C | H | N | O |
|---|---|---|---|---|
| Calculated: | 61.3% | 5.2% | 10.2% | 23.3% |
| Found: | 61.5% | 5.0% | 9.9% | 23.2% |

EXAMPLE 2

156.5 parts of monohydrate, 43.5 parts of 23% strength oleum and 5.4 parts of boric acid are heated for 30 minutes at 50° C., while stirring. The mixture is then cooled to to 30° C. and 10 parts of the dye obtained as described in Example 1 are introduced. 1.8 parts of bromine are then added. After stirring for 3½ hours at 30° C., the dye is precipitated by introducing the batch into a mixture of ice and water. The reaction product is filtered off, washed neutral with water and dried. Yield: 10 parts of dye, in the form of a blue powder, having a bromine content of 10.9% (calculated for the monobromo-compound of (I): 16.3%). The dye is a mixture of the compounds where $n$ is 0 and $n$ is 1, respectively.

EXAMPLE 3

1.3 parts of boric acid are dissolved in 50 parts of monohydrate at 50° C., while stirring. After cooling the mixture to 30° C., 4.1 parts of the dye manufactured as described in Example 1 are introduced, and chlorine gas is then passed into the solution for 2 hours at 40° C. The reaction mixture is stirred for a further 15 hours at room temperature and the chlorination product is precipitated by pouring into 500 parts of water. The precipitate is filtered off, washed neutral with water and dried.

Yield: 3.7 parts of dye containing 9.2% of chlorine (calculated for the monochloro-compound: 8.0%). The dye is a mixture of the monochloro-compound and dichloro-compound.

EXAMPLE 4

50 parts of phenol, 4.4 parts of boric acid and 40 parts of toluene are heated for 3 hours at 160° C. and the water formed is distilled off at the same time. After cooling to 80° C., 12.9 parts of 4-(β-amino-ethyl)-tetrahydropyran and 15 parts of 1-amino-8-nitro-4,5-dihydroxyanthraquinone are added. The reaction mixture is heated for 50 minutes at 100° C., mixed with 350 parts of methanol and cooled overnight. The reaction product which has precipitated is filtered off, washed with methanol and dried. 11.2 parts of dye of the formula I, where n is 0 and Y is

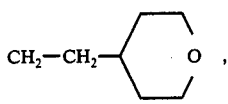

are obtained. Melting point: 147° C.

EXAMPLE 5

The procedure described in Example 4 is followed, but instead of 4-(β-amino-ethyl)-tetrahydropyran the same amount of a mixture of 3-aminomethyl-4-methyl-tetrahydropyran and 4-amino-methyl-4-methyl-tetrahydropyran (in the ratio of about 1:1 parts) is used. A mixture of the dye I where $n$ is 0 and Y is

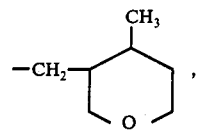

and of the dye I where $n$ is 0 and Y is

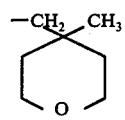

is obtained.

EXAMPLE 6

The procedure described in Example 2 is followed, but the starting material used is the product obtained as described in Example 5. 9.4 parts of the dye are obtained in the form of a blue powder having a bromine content of 7.9%. The dye is a mixture of the compounds where $n$ is 0 and $n$ is 1, respectively.

EXAMPLE 7

The procedure described in Example 2 is followed, but the starting material used is the product obtained as described in Example 4. 10.2 parts of a dye which conains 10.3% of bromine are isolated. The dye essentially consists of the monobromo-compound.

We claim:
1. Anthraquinonoid disperse dye of the formula

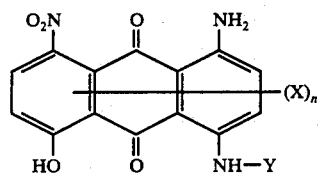

where X is chlorine or bromine, Y is

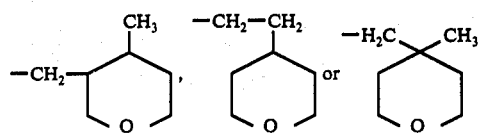

and $n$ is 0, 1 or 2, or a mixture thereof.

2. A dye as claimed in claim 1, where X is bromine and $n$ is 0 or 1.

3. Anthraquinonoid disperse dye as claimed in claim 2, which is in the form of a dye mixture containing from 5 to 12% by weight of bromine, based on the mixture.

4. A dye of the formula

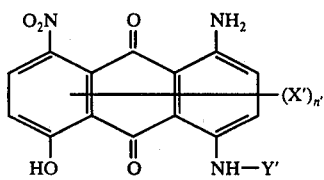

where X is bromine, Y' is

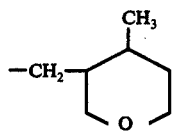
and n' is 0 or 1, or a mixture thereof.
5. A dye as claimed in claim 4, which is in the form of a dye mixture containing from 5 to 12% by weight of bromine, based on the mixture.
6. The dye of the formula
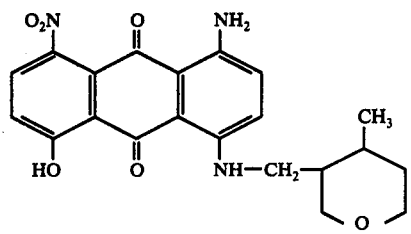
7. The dye of the formula
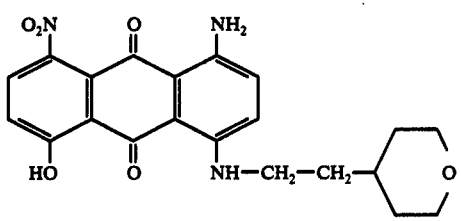
8. The dye of the formula
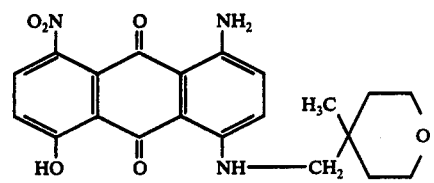
* * * * *

UNITED STATES PATENT AND TRADEMARK OFFICE
CERTIFICATE OF CORRECTION

PATENT NO. : 4,119,644
DATED : October 10, 1978
INVENTOR(S) : EPPLE ET AL

It is certified that error appears in the above–identified patent and that said Letters Patent are hereby corrected as shown below:

In claim 4, first line after the first formula, cancel "X" and substitute --X'--.

Signed and Sealed this

First Day of May 1979

[SEAL]

*Attest:*

RUTH C. MASON
*Attesting Officer*

DONALD W. BANNER
*Commissioner of Patents and Trademarks*